United States Patent [19]

Iida et al.

[11] 4,017,379

[45] Apr. 12, 1977

[54] CONVERSION PROCESS OF HYDROCARBONS

[75] Inventors: Tetsuya Iida; Hideo Saori, both of Yokohama; Masao Inoguchi, Tsukui; Hiroo Tominaga, Matsudo, all of Japan

[73] Assignee: Showa Oil Company, Ltd., Tokyo, Japan

[22] Filed: May 7, 1975

[21] Appl. No.: 575,386

[30] Foreign Application Priority Data

Nov. 7, 1974 Japan .............................. 49-127479

[52] U.S. Cl. .................................. 208/68; 208/58; 208/59; 208/264

[51] Int. Cl.² ................ C10G 13/06; C10G 23/02; C10G 37/04

[58] Field of Search ................. 208/68, 59, 264, 58

[56] References Cited

UNITED STATES PATENTS

| | | | |
|---|---|---|---|
| 2,706,705 | 4/1955 | Oettinger et al. | 208/59 |
| 3,089,843 | 5/1963 | Eastman et al. | 208/58 |
| 3,148,135 | 9/1964 | Schlinger et al. | 208/58 |
| 3,380,910 | 4/1968 | Griffiths | 208/58 |
| 3,738,931 | 6/1973 | Frankovich et al. | 208/67 |

*Primary Examiner*—Herbert Levine
*Assistant Examiner*—G. E. Schmitkons
*Attorney, Agent, or Firm*—Oldham & Oldham Co.

[57] ABSTRACT

This invention relates to a process for effectively and completely converting into a useful hydrocarbon oil comprising naphtha, kerosene and gas oil with high cracking rate, the tar-sand bitumen and the vacuum residues from various petroleum or origins which are difficult to treat in comparison with the ordinary crude oil and contain large amount of asphaltenes and resins according to the combined process of the thermal cracking and hydrocracking.

The present invention is useful to manufacture the pollution-free product oil from the tar-sand bitumen and the vacuum residues from the various petroleum origins with high desulfurization percentage of more than 90%. The product oil can be used as the superior fuel oil having less sulfur and metal contents and also as the starting material suitable for the secondary processing.

8 Claims, No Drawings

CONVERSION PROCESS OF HYDROCARBONS

DETAILED EXPLANATION OF THE INVENTION

This invention relates to a process for producing an useful and pollution-free hydrocarbon oil from a heavy oil such as the tar-sand bitumen and vacuum residues from various petroleum origins.

In more detail, this invention relates to the process for producing the pollution-free hydrocarbon oil having high utility with high efficiency by effectively combining the thermal cracking and hydrocracking processes of the said heavy oil.

At present it is very desirable to establish a method for the effective utilization of the extract oil from the tar-sand and the oil shale which exceed the estimated minimum amount of petroleum deposit in view of for the tendency of exhaustion of the high quality petroleum resources.

For example, the output of bitumen from the tar-sand is estimated to be 150,000 million tons. The tar-sand is broadly distributed in Canada, Venezuela, U.S.A., U.S.S.R. and Rumania.

The tar-sand contains 8–12 wt. percent of the heavy oil. The recovery of the heavy oil from the tar-sand is effected by blowing steam into either the tar-sand mined from the outcrop or the tar-sand buried under the ground. The oil fraction recovered from the tar-sand according to the process as mentioned above is not only the heavy oil having specific gravity of more than 1.0 but also very high viscous oil having viscosity of 70 cSt at 210° F.

The oil fraction contains more than 4wt. percent of sulfur, large quantities of the nitrogen compounds, the oxygen compounds, the organic vanadium compounds (more than 150 ppm of vanadium), the organic nickel compounds (more than 70 ppm of Ni), alkali earth metal, iron and fine particles of clay having about 40$\mu$ diameter. The tar-sand oil contains large amount of asphaltenes and resins.

Because of the inferior quality of the heavy oil as mentioned above, it is very difficult to treat in comparison with the vacuum residues, from ordinary crude oil. The conventional treating process of the tar-sand bitumen is the coking process which gives a product comprising about 60 wt% of the distillate, about 10 wt% of the gaseous product and about 30 wt% of coke.

The gaseous product and the distillate obtained from the tar-sand bitumen are refined to hydrogenate the unsaturated compounds and to remove the sulfur compound by the hydrotreating. However, as the coke obtained from the bitumen contains a large amount of sulfur and ash comprising various kind of metals, therefore the usage of coke is limited.

The inventors have arrived at the present invention on the basis of the result of research about the process for effectively producing the useful and pollution-free hydrocarbon oil from the standpoint of the effective utilization of the bad quality heavy oil. Namely, the bitumen from the tar-sand is completely converted into the fractions comprising naphtha, kerosene and gas oil while controlling the gasification, by thermal cracking and then by hydrocracking under the certain conditions respectively.

The product obtained is useful as a fuel oil having a low sulfur content and a low metal content and also as the starting material for the secondary processing.

Giving full particulars of the thermal cracking process, the conventional thermal cracking, Visbreaking for example, is effected under the reaction conditions of 480°–540° C and about 20 Kg/cm$^2$, and it aims for lowering of viscosity and pour point of the vacuum distillates.

But, by the thermal cracking, the desulfurization, the denitrogenation and the demetallization of the vacuum residues cannot be expected. The conventional thermal cracking process does not serve to completely convert the vacuum residues to the low boiling fractions.

As to the hydrocracking, it is very difficult to select the hydrocracking conditions in which the desulfurization, the denitrogenation and the demetallization of the heavy oil are effectively carried out. Even if the hydrocracking conditions capable of effecting the desulfurization, the denitrogenation and the demetallization, namely the reaction temperature, the hydrogen pressure, the liquid hourly space velocity, the gas velocity and the catalyst can be selected, it is difficult to completely convert the vacuum residues (boiling point of more than 530° C) into the middle boiling point fractions comprising kerosene and gas oil.

One of the objects of this invention relates to providing a process for completely converting into the product oil of high value, the tar-sand bitumen and the vacuum residues from the various petroleum origins which are very difficult to treat because of large amount of sulfur, nitrogen, the metal compounds and asphaltenes, by the thermal cracking and hydrocracking under the certain reaction conditions respectively.

Another one of objects of this invention relates to providing the process for converting the tar-sand bitumen and the vacuum residues to the useful and pollution-free product oil comprising naphtha, kerosene and gas oil and containing less sulfur compounds.

THE STARTING MATERIAL

The starting material used in this invention comprises the heavy oils having specific gravity (15/4° C) of 0.90–1.10 such as tar-sand bitumen, shale oil, atmospheric and vacuum residues from petroleum origins.

THE THERMAL CRACKING

The thermal cracking is effected under the certain conditions, namely at the temperature of 400°–800° C, preferably 450°–530° C, the hydrogen pressure of 1–200 Kg/cm$^2$, preferably 20–50 Kg/cm$^2$ and the contact time of 10–500 seconds, preferably 100–300 seconds.

The amount of asphaltenes contained in the starting material increases by the thermal cracking, and the more the conditions of the thermal cracking becomes severe, the more the amount of asphaltenes tend to increase.

The property of the thermal cracked asphaltenes is different from that of asphaltenes originally contained in the crude oil. In more detail, the asphaltenes are the most heavy component of the heavy oil and consist of the condensed polycyclic aromatic rings in the fundamental structure, and also contain naphthene and paraffin side chains. Sulfur, nitrogen and/or oxygen atoms, heavy metals such as vanadium and nickel etc. are contained in the structure of the condensed polycyclic aromatic rings.

Resins are similar to asphaltenes in the structure, but the ratio of naphthene and paraffin side chains to the condensed aromatic rings is greater than that of asphaltenes.

Under the thermal cracking conditions, asphaltenes are converted to the lower molecular compounds of the condensed polycyclic aromatic structure by the thermal dealkylation of the paraffin side chains and by the thermal cracking of the naphthene rings.

Resins are also similarly converted to the lower molecular asphaltenes by splitting the paraffin and naphthene side chains.

The more the conditions of the thermal cracking becomes severe, the more the cracking proceeds excessively, whereby the gasification is accelerated, the generation of olefin gas increases and the coking of the condensed polyaromatic compounds occurs.

In view of the said matters, it is not preferable to make the conditions of the thermal cracking too severe, when it is desired that the heavy oil is completely converted to the middle boiling point fractions.

The asphaltenes have the structure of the large micelle which is the cluster of the condensed polyaromatic compounds and contains hetroatoms. Therefore, it is very difficult to disperse the asphaltene molecules in the pores of the catalyst for the hydrocracking of the heavy oil.

Since asphaltenes become the small molecules by the thermal cracking, they are easier to close with the active sites of the catalyst in the subsequent hydrocracking, thereby making it possible to dissociate the asphaltene micelles and to hydrocrack the asphaltene molecules.

It has been found that the tar-sand bitumen and the vacuum residues are completely converted to the useful and pollution-free hydrocarbon oil comprising naphtha, kerosene and gas oil when the hydrocracking, the subsequent step of the thermal cracking, is carried out after the amount of asphaltenes contained in the tar-sand bitumen and the vacuum residues amounted to the certain extent by the thermal cracking.

Namely, although the reaction conditions of the thermal cracking depends on the kind of the starting material, it has been found that by the subsequent hydrocracking, the thermally treated tar-sand bitumen and the vacuum residues are converted to the fractions having the boiling point of less than 530° C without any remaining residue, while restraining the formation of $C_1 - C_4$ gas to less than a few % when the thermal cracking condition is selected so as to increase the amount of asphaltenes contained in the thermally treated oil to 1.2 – 3.0 times of that of the starting material.

THE HYDROCRACKING

The hydrocracking of this invention is effected under the certain conditions, namely the reaction temperature of 350°–500° C, preferably 390°–450° C; the liquid hourly space velocity of 0.1–5, preferably 0.5–1.5; the hydrogen pressure of 50–300 Kg/cm², preferably 100–200 Kg/cm², the hydrogen feed rate of 500–3,000 l–H₂/l–oil, preferably 800–1,500 l–H₂/l–oil. The catalyst used in the hydrocracking is selected from the catalysts comprising one or more than two kinds of metals of the 6th or the 8th groups of the periodic table, for example, Mo—Co, Mo—Ni, W—Ni, Mo—Co—Ni, W—Co—Ni—or W—Co—Ni—Mo carried on γ-alumina obtainable from alumina comprising substantially boehmite and boehmite gel from the stand point of the X ray diffraction spectrum diagram. The carrier used in the catalyst of the hydrocracking may be γ-alumina having any physical properties. The most suitable carrier is manufactured by calcining at the two step calcining tempertures (the first step calcining temperature of 100°–400° C, 2–10 hrs; the second step calcining temperature of 400°–700° C, 1–10 hrs), the alumina gel obtained by washing alumina gel with alcohol without aging, while controlling the formation of bayerite.

Among the alumina carrier manufactured as mentioned above, the most suitable one is the alumina carrier showing the acidic colour by the benzene azodiphenyl amine indicator of pKa + 1.5. Silica may be added to the alumina carrier.

The physical properties of the alumina carrier used in the hydrocracking catalyst are the surface area of 100–450 m²/g, preferably 150–300 m²/g; the pore volume of 0.3–0.9 ml/g, preferably 0.4–0.6 ml/g; the bulk density of 0.3–0.9 g/ml., preferably 0.4–0.6 g/ml; the mean ppore diameter of 50–240 A, preferably 120–160 A; the crystalline form (after hydrolysis) of boehmite gel.

The methods for supporting the active metal on the alumina carrier, drying the carried catalyst, calcining and activating thereof can be accomplished according to conventional methods. The catalyst used in this invention, for example, possesses the properties of the surface area of 196–210 m²/g, the pore volume of 0.57–0.58 ml/g, the mean pore diameter of 134–141 A, the bulk density of 0.65–0.67 g/ml and the bulk crashing strength of 5.4–6.6 Kg/cm².

EXAMPLE 1

The process of this invention was carried out using the tar-sand bitumen as the starting material. The reactor was used in the thermal cracking was stainless steel pipe providing the effective reaction volume of about 28 cm³.

The reactor used in the hydrocracking was the fixed bed high pressure tubular flow type reactor of stainless steel having the inner diameter of 30 mm, and the length of 1,240 mm. And the catalyst used was the extruded catalyst of 200 ml having the diameter of 1.5 mm.

| The properties of the tan-sand bitumen | |
|---|---|
| Specific gravity (15/4° C) | 1.004 |
| Viscosity (378° C, cSt) | 3,064 |
| Ash (wt%) | 0.7 |
| The compositional analysis (wt%) | |
| Saturates | 35.8 |
| Aromatics | 33.7 |
| Resins | 12.5 |
| Asphaltenes | 7.1 |
| Benzene insoluble matter | 0.9 |
| The elemental analysis (wt%) | |
| Carbon | 83.73 |
| Hydrogen | 10.18 |
| Sulfur | 4.28 |
| Nitrogen | 0.36 |
| Oxygen | — |
| The metals (ppm) | |
| Vanadium | 153 |
| Nickel | 74 |
| Iron | 285 |
| Calcium | 155 |
| Sodium | 65 |
| The reaction conditions | |
| (1) The thermal cracking | |
| Reaction temperature (° C) | 470–490° C |
| Reaction pressure (Kg/cm²) | 40 |
| Liquid hourly space velocity (v/v hr) | 15 |
| Contact time (sec.) | 240 |
| Hydrogen feed rate (l-H₂/l-oil) | −12 |

-continued (2) The hydrocracking
Reaction temperature (° C)  390–430° C
Reaction pressure (Kg/cm$^2$)  100
Liquid hourly space velocity (v/v hr)  1.0
Hydrogen feed rate (1-H$_2$/1-oil)  2,000
Catalyst used, Ni-Co-Mo/Al$_2$O$_3$  Carrier
(NiO:CoO:MoO$_3$ = 2.5:2.5:15)

THE EXPERIMENTAL RESULTS

Table 1 shows the test results of the thermal cracking and the hydrocracking of the tar-sand bitumen, while table 2 shows the test result obtained by the combined processes of the thermal cracking and hydrocracking of the tar-sand bitumen.

It has been proven from the tables 1 and 2 that the tar-sand bitumen is cracked to the product oil without remaining the fractions having the boiling point of more than 530° C.

EXAMPLE 2

The tar-sand bitumen has been treated according to the process of this invention under the same reaction condition to those of the example 1 to investigate the removal of sulfur, nitrogen, metal and asphaltenes. It has been proved from the tables 3 and 4 that the superior effects about the removal of sulfur, nitrogen, metal and asphaltenes are obtained according to the process of this invention.

EXAMPLE 3

The vacuum residue of Iranian Heavy crude having the following properties have been treated according to the process of this invention under the same reaction conditions to those of the example 1.

| The properties of vacuum residue of Iranian Heavy crude | |
|---|---|
| Specific gravity (15/4° C) | 1.017 |
| Viscosity (150° C, cSt) | 173 |
| Ash (wt%) | 0.05 |
| The compositional analysis (wt%) | |
| Saturates | 16.2 |
| Aromatics | 45.9 |
| Resins | 28.0 |
| Asphaltenes | 9.3 |
| Benzene insoluble matters | 0.6 |
| The elemental analysis (wt%) | |
| Carbon | 83.69 |
| Hydrogen | 10.33 |
| Sulfur | 3.38 |
| Nitrogen | 0.75 |
| Oxygen | — |
| The metals (ppm) | |
| Vanadium | 213 |
| Nickel | 64 |
| Iron | — |
| Calcium | — |
| Sodium | 51 |

It has been proved from the tables 5–7 that the superior effects about the removal of sulfur, nitrogen, metal and asphaltenes are obtained according to the process of this invention.

Table 1

The test result of the thermal cracking and the hydrocracking of the tar-sand bitumen.

| | Starting material (tar sand bitumen) | Thermal cracking No. 1 | Thermal cracking No. 2 | Thermal cracking No. 3 | Hydro-cracking |
|---|---|---|---|---|---|
| Reaction conditions | | | | | |
| Temperature (° C) | | 470 | 480 | 490 | 410 |
| Pressure (Kg/cm$^2$) | | 40 | 40 | 40 | 100 |
| Liquid hourly space velocity (v/v hr) | | 14.8 | 14.6 | 14.6 | 1.0 |
| Hydrogen feed rate (1-H$_2$/1-oil) | | 12.3 | 9.9 | 12.1 | 2,000 |
| The product distribution (wt%) | | | | | |
| Gas and condensate | | 4.4 | 8.43 | 10.19 | — |
| Naphtha (IBP–240° C) | 0.0 | 11.30 | 16.85 | 19.34 | 8.28 |
| Gas oil (240–350° C) | 15.12 | 19.06 | 20.89 | 21.02 | 25.09 |
| Vacuum gas oil (350–530° C) | 34.38 | 35.00 | 29.49 | 28.70 | 39.54 |
| Residues (530° C$^+$) | 50.50 | 30.22 | 24.34 | 20.75 | 27.09 |
| Conversion of the residue (%) | — | 40.16 | 51.80 | 58.91 | 44.36 |

Table 2

The test result obtained by the combined processes of the thermal cracking and hydrocracking of the tar-sand bitumen.

| | Starting Material (oil) (Thermally treated tar sand bitumen) | Hydrocracking No. 4 | Hydrocracking No. 5 | Hydrocracking No. 6 |
|---|---|---|---|---|
| Reaction conditions | | | | |
| Temperature (° C) | | 390 | 410 | 430 |
| Pressure (kg/cm$^2$) | | 100 | 100 | 100 |
| Liquid hourly space velocity (v/v hr) | | 1.0 | 1.0 | 1.0 |
| Hydrogen feed rate (1-H$_2$/1-oil) | | 2,000 | 2,000 | 2,000 |
| Distribution of the product oil (wt%) | | | | |
| | | 18.46 | 20.68 | 26.73 |
| Naphtha (IBP-240° C) | 15.27 | 31.97 | 32.34 | 37.40 |
| Gas oil (240–350° C) | 22.14 | 36.30 | 38.71 | 35.43 |
| Vacuum gas oil (350–530° C) | 34.70 | 13.27 | 8.27 | 0.44 |
| Residue (530° C$^+$) | 27.89 | | | |
| Conversion of the residue (%) | | 52.42 | 70.35 | 98.42 |

Table 3

The removal of sulfur, nitrogen, metal and asphaltenes from the tar-sand bitumen by the thermal cracking and the hydrocracking respectively.

|  | Fraction | Naphtha | Gas oil | Vacuum gas oil | Residues |
|---|---|---|---|---|---|
|  | Boiling point range (° C) | IBP~240 | 240~350 | 350~530 | 530+ |
| The tar-sand bitumen | Yield (wt %) |  | 15.12 | 34.38 | 50.50 |
|  | Sulfur content (″) |  | 1.86 | 3.12 | 5.80 |
|  | Sulfur distribution (″) |  | 0.82 | 1.07 | 2.93 |
|  | Nitrogen content (wt %) |  |  | 0.15 | 0.65 |
|  | Nitrogen distribution (″) |  |  | 0.05 | 0.33 |
|  | Metal content (Ni + V) (ppm) |  |  | 3 | 435 |
|  | Metal distribution (″) |  |  | 1 | 220 |
|  | Asphaltenes (wt %) |  |  |  | 20.0 |
|  | Asphaltene distribution (″) |  |  |  | 10.1 |

Note: Asphaltenes contain the benzene insoluble matters.
The sulfur distribution = the sulfur content of the fractions × the yield of the fractions.
The nitrogen, metal and asphaltene distributions were calculated by the same way as mentioned above.

Table 3 — Continued

|  | Fraction | Naphtha | Gas oil | Vacuum gas oil | Residues | Removal (%) |
|---|---|---|---|---|---|---|
|  | Boiling point range (° C) | IBP~240 | 240~350 | 350~530 | 530+ | (per starting material) |
| The thermal cracked oil (Reaction temperature 480° C) | Yield (wt%) | 15.27 | 22.14 | 34.70 | 27.89 |  |
|  | Sulfur content (″) | 1.50 | 2.37 | 3.72 | 5.83 |  |
|  | Sulfur distribution (″) | 0.23 | 0.53 | 1.29 | 1.63 | 13.8 |
|  | Nitrogen content (″) |  |  | 0.27 | 1.08 |  |
|  | Nitrogen distribution (″) |  |  | 0.09 | 0.30 | 0 |
|  | Metal content (Ni + V) (ppm) |  |  | 4 | 856 |  |
|  | Metal distribution (″) |  |  | 1 | 239 | 0 |
|  | Asphaltenes (wt%) |  |  |  | 42.8 |  |
|  | Asphaltene distribution (″) |  |  |  | 11.9 |  |
| The hydrocracked oil (Reaction temperature 410° C) | Yield (wt%) | 8.28 | 25.09 | 39.54 | 27.09 |  |
|  | Sulfur content (″) | 0.32 | 0.67 | 0.91 | 3.45 |  |
|  | Sulfur distribution (″) | 0.03 | 0.17 | 0.36 | 0.93 | 65.2 |
|  | Nitrogen content (″) |  |  | 0.26 | 0.75 |  |
|  | Nitrogen distribution (″) |  |  | 0.10 | 0.20 | 21.0 |
|  | Metal content (Ni + V) (ppm) |  |  | 5 | 265 |  |
|  | Metal distribution (″) |  |  | 2 | 99 | 54.3 |
|  | Asphaltenes (wt%) |  |  |  | 24.8 |  |
|  | Asphaltene distribution (″) |  |  |  | 6.7 | 33.7 |

Table 4

The removal of sulfur, nitrogen, metal and asphaltenes from the tar-sand bitumen according to the process of this invention.

|  |  | Fraction | Naphtha | Gas oil | Vacuum Gas oil | Residues | Removal (%) |
|---|---|---|---|---|---|---|---|
|  |  | Boiling point range (° C) | IBP~240 | 240~350 | 350~530 | 530+ | (per the starting material) |
| The product oil | Reaction temperature 390° C | Yield (wt%) | 18.46 | 31.97 | 33.24 | 16.33 |  |
|  |  | Sulfur content (wt%) | 0.26 | 0.20 | 0.68 | 3.93 |  |
|  |  | Sulfur distribution (wt%) | 0.05 | 0.06 | 0.23 | 0.64 | 77.1 |
|  |  | Nitrogen content (wt%) |  |  | 0.28 | 0.95 |  |
|  |  | Nitrogen distribution (wt%) |  |  | 0.09 | 0.16 | 34.2 |
|  |  | Metal content (Ni + V) (ppm) |  |  | 4 | 745 |  |
|  |  | Metal distribution (″) |  |  | 1 | 122 | 44.3 |
|  |  | Asphaltenes (″) |  |  |  | 37.4 |  |
|  |  | Asphaltene distribution (″) |  |  |  | 6.1 | 39.6 |
|  | Reaction temperature 410° C | Yield (wt%) | 20.68 | 32.34 | 35.37 | 11.61 |  |
|  |  | Sulfur content (wt%) | 0.32 | 0.28 | 0.44 | 2.08 |  |
|  |  | Sulfur distribution (wt%) | 0.07 | 0.09 | 0.16 | 0.24 | 86.9 |
|  |  | Nitrogen content (wt%) |  |  | 0.30 | 0.71 |  |
|  |  | Nitrogen distribution (wt%) |  |  | 0.11 | 0.08 | 50.0 |
|  |  | Metal content (Ni + V) (ppm) |  |  | 4 | 265 |  |
|  |  | Metal distribution (″) |  |  | 1 | 31 | 85.5 |
|  |  | Asphaltenes (ppm) |  |  |  | 15.9 |  |
|  |  | Asphaltene distribution (ppm) |  |  |  | 1.8 | 82.2 |
|  | Reaction temperature 430° C | Yield (wt%) | 26.73 | 37.40 | 31.03 | 4.84 |  |
|  |  | Sulfur content (wt%) | 0.33 | 0.37 | 0.50 | 0.80 |  |
|  |  | Sulfur distribution (wt%) | 0.09 | 0.14 | 0.16 | 0.04 | 90.0 |
|  |  | Nitrogen content (wt%) |  |  | 0.34 | 0.56 |  |
|  |  | Nitrogen distribution (wt%) |  |  | 0.11 | 0.03 | 63.2 |
|  |  | Metal content (Ni + V) (ppm) |  |  | 4 | 166 |  |
|  |  | Metal distribution (″) |  |  | 1 | 8 | 95.9 |
|  |  | Asphaltenes (″) |  |  |  | 3.2 |  |
|  |  | Asphaltene distribution (″) |  |  |  | 0.2 | 98.0 |

Table 5

The test result of the thermal cracking of the vacuum residues of Iranian Heavy crude

|  | Feed | Thermal cracking |
|---|---|---|
| Reaction conditions |  |  |
| Temperature (° C) | — | 480 |
| Pressure (kg/cm²) | — | 40 |
| Liquid hourly space velocity (v/v hr) | — | 20 |
| Hydrogen feed rate (l-H₂/l-oil) | — | 12 |
| Product distribution (wt%) |  |  |
| Gas and condensate | — | 7.21 |
| Naphtha (IBP 240° C) | — | 5.51 |
| Conversion of the residue (%) | — | 45.40 |
| Gas oil (240~350° C) | — | 10.46 |
| Vac. Gas oil (350~530° C) | — | 22.22 |
| Residue (530° C⁺) | 100.00 | 54.60 |

Table 6

The test result obtained by the combined processes of the thermal cracking and hydrocracking of the vacuum residue of Iranian Heavy crude

|  | Feed (Thermal cracked oil) | Hydrocracking No. 1 | Hydrocracking No. 2 | Hydrocracking No. 3 |
|---|---|---|---|---|
| Reaction conditions |  |  |  |  |
| Temperature (° C) |  | 390 | 410 | 430 |
| Pressure (kg/cm²) |  | 100 | 100 | 100 |
| Liquid hourly space velocity (v/v hr) |  | 1.0 | 1.0 | 1.0 |
| Hydrogen feed rate (l-H₂/l-oil) |  | 2,000 | 2,000 | 2,000 |
| Product distribution (wt%) |  |  |  |  |
| Gas and Condensate | — | — | — | — |
| Naphtha (IBP~240° C) | 5.94 | 9.53 | 10.96 | 14.00 |
| Gas oil (240~350° C) | 11.27 | 16.47 | 20.21 | 23.84 |
| Vac. gas oil (350~530° C) | 23.95 | 35.25 | 36.43 | 42.05 |
| Residue (530° C⁺) | 58.84 | 38.85 | 32.40 | 20.11 |
| Conversion of the residue (%) | — | 34.03 | 44.98 | 65.85 |

Table 7

The removal of sulfur, nitrogen, metal and asphaltenes from the vacuum residues of Iranian Heavy crude by the process of this invention

|  |  | Fraction | Naphtha | Gas oil | Vacuum gas oil | Residues | Removal (%) |
|---|---|---|---|---|---|---|---|
|  |  | Boiling range (° C) | IBP~240 | 240~350 | 350~530 | 530⁺ |  |
|  |  | Yield (wt%) | — | — | — | 100.00 |  |
|  |  | Sulfur content (wt%) |  |  |  | 3.38 |  |
| Vacuum residue | Sulfur distribution ('') | — | — | — | 3.38 | — |
| of | Nitrogen content (wt%) |  |  |  | 0.70 |  |
| Iranian | Nitrogen distribution ('') | — | — | — | 0.70 | — |
| Heavy | Metal content (Ni+V) (ppm) |  |  |  | 277 |  |
| crude | Metal distribution ('') | — | — | — | 277 | — |
|  | Asphaltenes (wt%) |  |  |  | 9.9 |  |
|  | Asphaltenes distribution ('') | — | — | — | 9.9 | — |
|  |  | Yield (wt%) | 5.94 | 11.27 | 23.95 | 58.89 |  |
|  | Thermal | Sulfur content (wt%) | 1.35 | 1.81 | 2.65 | 4.07 |  |
|  | cracked oil | Sulfur distribution ('') | 0.08 | 0.20 | 0.63 | 2.40 | 2.2 |
|  | (Reaction | Nitrogen content (wt%) | 0.35 |  |  | 1.08 |  |
|  | temp. 480° C) | Nitrogen distribution ('') | — | — | 0.08 | 0.64 | 9.1 |
|  |  | Metal content (Ni+V) (ppm) |  |  | 3 | 467 |  |
|  |  | Metal distribution ('') | — | — | 1 | 276 | 0 |
|  |  | Asphaltenes (wt%) |  |  |  | 34.3 |  |
|  |  | Asphaltenes distribution ('') | — | — | — | 20.2 |  |
|  |  | Yield (wt%) | 9.53 | 16.47 | 35.25 | 38.85 |  |
|  |  | Sulfur content (wt%) | 0.20 | 0.45 | 1.23 | 2.70 |  |
|  |  | Sulfur distribution ('') | 0.02 | 0.07 | 0.43 | 1.05 | 53.6 |
|  |  | Nitrogen content (wt%) |  |  | 0.38 | 1.07 |  |
|  | Reaction | Nitrogen distribution ('') | — | — | 0.13 | 0.42 | 21.4 |
|  | temp. 390° C | Metal content (ni + V) (ppm) |  |  | 0 | 440 |  |
|  |  | Metal distribution ('') | — | — | 0 | 171 | 38.3 |
| Thermal |  | Asphaltenes (wt%) |  |  |  | 17.8 |  |
| cracked |  | Asphaltenes distribution ('') | — | — | — | 6.9 | 30.0 |
| and |  | Yield (wt%) | 10.96 | 20.21 | 36.43 | 32.40 |  |
| hydrocracked |  | Sulfur content (wt%) | 0.16 | 0.19 | 0.81 | 2.13 |  |
| Oil |  | Sulfur distribution ('') | 0.02 | 0.04 | 0.30 | 0.69 | 68.9 |
|  |  | Nitrogen content (wt%) |  |  | 0.44 | 1.02 |  |
|  | Reaction | Nitrogen distribution ('') | — | — | 0.16 | 0.33 | 29.2 |
|  | temp. 410° C | Metal content (ni + V) (ppm) |  |  |  | 329 |  |
|  |  | Metal distribution ('') | — | — | — | 107 | 61.5 |
|  |  | Asphaltenes (wt%) |  |  |  | 14.4 |  |
|  |  | Asphaltenes distribution ('') | — | — | — | 4.7 | 52.7 |
|  |  | Yield (wt%) | 14.00 | 23.84 | 42.05 | 20.11 |  |
|  |  | Sulfur content (wt%) | 0.12 | 0.15 | 0.46 | 1.29 |  |
|  |  | Sulfur distribution ('') | 0.02 | 0.04 | 0.19 | 0.26 | 84.9 |
|  |  | Nitrogen content (wt%) |  |  | 0.49 | 1.08 |  |
|  | Reaction | Nitrogen distribution ('') | — | — | 0.21 | 0.22 | 38.6 |
|  | temp. 430° C | Metal content (Ni + V) (ppm) |  |  |  | 210 |  |
|  |  | Metal distribution ('') | — | — | — | 42 | 84.8 |
|  |  | Asphaltenes (wt%) |  |  |  | 12.2 |  |
|  |  | Asphaltenes distribution ('') | — | — | — | 2.4 | 75.3 |

What is claimed is:

1. A process for converting hydrocarbon wherein the process comprises (a) a step of thermal cracking of a tar-sand bitumen and vacuum residues having a boiling point of more than 530° C from various petroleum origins at a temperture of 400°14 800° C, a hydrogen pressure of 1–200 Kg/cm² and a contact time of 10–500 seconds to increase the amount of asphaltenes contained in the thermal cracked oil to 1.2 – 3.0 times of the amount of asphaltenes originally contained in the starting material and (b) a step of hydrocracking of the entire product oil obtained by the process of the step (a) at a temperature of 350°–500° C, a hydrogen pressure of 50–300 Kg/cm² and a liquid hourly space velocity of 0.1 – 5, in the presence of a catalyst supporting a metal or metals selected from the 6th and 8th groups of the periodic table on a carrier.

2. A process as claimed in the claim 1 wherein the tar-sand bitumen and the vacuum residues from the various petroleum origins are thermally cracked at the temperture of 450–530° C, the hydrogen pressure of 20–50 Kg/cm$^2$, and the contact time of 100–300 seconds.

3. A process for claimed in the claim 1 wherein the tar-sand bitumen and the vacuum residues from the various petroleum origins thermally cracked according to the step (a) as claimed in the claim 1 are hydrocracked at the temperature of 390°–450° C, the liquid hourly space velocity of 0.5–1.5 the hydrogen pressure of 100–200 Kg/cm$^2$ and the hydrogen feed rate of 800–1,500 1-H$_2$/1-oil in the presence of the catalyst claimed in the claim 1.

4. A process claimed in the claim 1 wherein the hydrocracking catalyst is selected from the group comprising Mo—Co, Mo—Ni, W—Ni, Mo—Co—Ni, W—Co—Ni, and W—Co—Ni—Mo supported on the carrier.

5. A process claimed in claim 4 wherein the carrier is γ-alumina indicating the acidic colour by the benzene azodiphenyl amine indicator of pKa + 1.5 and manufacturing said catalysts from boehmite and boehmite gel by washing alumina gel with alcohol without aging, while controlling the formation of bayerite and then calcining the obtained gel at two steps, the first step of 100°–400° C, 2–10 hrs, and the 2nd step of 400°–700° C, 1–10 hrs.

6. A process claimed in the claim 5 wherein the carrier is γ-alumina having the properties of the surface of 100–450 m$^2$/g, the pore volume of 0.3–0.9 ml/g, the bulk density of 0.3–0.9 g/ml and the mean pore diameter of 50–240 A.

7. A process claimed the in claim 1, wherein the carrier is boehmite gel having the properties of the surface area of 150–300 m$^2$/g, the pore volume of 0.5–0.8 ml/g, the bulk density of 0.4–0.6 g/ml and the mean pore diameter of 120–160 A.

8. A process claimed in the claim 1, wherein the hydrocracking catalyst possesses the properties of the surface area of 196–210 m$^2$/g, the pore volume of 0.57–0.58 ml/g, the mean pore diameter of 134–141 A, the bulk density of 0.65–0.67 g/ml and the bulk crushing strength of 5.4–6.6 Kg/cm$^2$.

* * * * *

UNITED STATES PATENT OFFICE
CERTIFICATE OF CORRECTION

Patent No. 4,017,379       Dated April 12, 1977

Inventor(s) Tetsuya Iida et al

It is certified that error appears in the above-identified patent and that said Letters Patent are hereby corrected as shown below:

Column 4, line 20, change "ppore" to -- pore --

Column 9, Table 5, line 9 of the table -- Conversion of the residue (%) - 45.40 -- should be the last line of the Table Claim 1, line 5, change "400° 14 800° C." to -- 400° - 800° C. --

Signed and Sealed this twelfth Day of July 1977

[SEAL]

Attest:

RUTH C. MASON
*Attesting Officer*

C. MARSHALL DANN
*Commissioner of Patents and Trademarks*